US012066197B2

(12) United States Patent
Narayanan et al.

(10) Patent No.: US 12,066,197 B2
(45) Date of Patent: Aug. 20, 2024

(54) LOW-DRAG, HIGH-EFFICIENCY MICROCHANNEL POLYMER HEAT EXCHANGERS

(71) Applicant: The Regents of the University of California, Oakland, CA (US)

(72) Inventors: Vinod Narayanan, Davis, CA (US); Erfan Rasouli, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 81 days.

(21) Appl. No.: 17/148,359

(22) Filed: Jan. 13, 2021

(65) Prior Publication Data
US 2022/0010981 A1   Jan. 13, 2022

Related U.S. Application Data

(60) Provisional application No. 62/960,625, filed on Jan. 13, 2020.

(51) Int. Cl.
*F24F 1/00* (2019.01)
*F24F 1/0007* (2019.01)
(Continued)

(52) U.S. Cl.
CPC ........ *F24F 1/0067* (2019.02); *F24F 1/00077* (2019.02); *F25B 9/002* (2013.01);
(Continued)

(58) Field of Classification Search
CPC .... F24F 1/0067; F24F 1/00077; F24F 1/0077; F25B 9/002; F25B 30/02; F25B 3/022;
(Continued)

(56) References Cited

U.S. PATENT DOCUMENTS

2008/0283220 A1* 11/2008 Martin ................. F01P 11/12
165/95
2010/0229585 A1 9/2010 Bradford et al.
(Continued)

FOREIGN PATENT DOCUMENTS

| CN | 103644749 A | * | 3/2014 | |
| CN | 107314699 A | * | 11/2017 | ........... F28D 9/0037 |

(Continued)

OTHER PUBLICATIONS

Narayanan, Vinod, et al., "Thermal Applications of Microchannel Flows", Encyclopedia of Aerospace Engineering, Wiley Online Library, Chapter eae613, 2013, pp. 1-16.
(Continued)

*Primary Examiner* — Harry E Arant
(74) *Attorney, Agent, or Firm* — O'BANION & RITCHEY LLP; John P. O'Banion

(57) ABSTRACT

The disclosed embodiments relate to a system that provides a polymer heat exchanger with internal microscale flow passages. The system includes a set of plates comprised of a polymer that includes internal microscale flow passages, which are configured to carry a liquid. The set of plates is organized into a stack, wherein consecutive plates in the stack are separated by fins to form intervening air passages. The system includes a liquid flow pathway, which flows from a liquid inlet, through the internal microscale flow passages in the stack of plates, to a liquid outlet. It also includes an airflow pathway, which flows from an airflow inlet, through the intervening air passages between the consecutive plates in the stack of plates, to an airflow outlet. The liquid flow pathway flows in a direction opposite to a direction of the airflow pathway to provide a counterflow design that optimizes heat transfer between the liquid flow pathway and the airflow pathway.

17 Claims, 20 Drawing Sheets
(2 of 20 Drawing Sheet(s) Filed in Color)

(51) Int. Cl.

| | |
|---|---|
| *F24F 1/0067* | (2019.01) |
| *F25B 9/00* | (2006.01) |
| *F25B 30/02* | (2006.01) |
| *F28F 3/02* | (2006.01) |
| *F28F 3/04* | (2006.01) |

(52) U.S. Cl.
CPC .............. *F25B 30/02* (2013.01); *F28F 3/022* (2013.01); *F28F 3/048* (2013.01); *F28F 2250/106* (2013.01); *F28F 2255/143* (2013.01); *F28F 2260/02* (2013.01)

(58) Field of Classification Search
CPC ... F25B 3/02; F28F 3/022; F28F 3/048; F28F 2250/106; F28F 2255/143; F28F 2260/02; F28F 3/10; F28F 2250/10; F28D 9/0037
See application file for complete search history.

(56) References Cited

U.S. PATENT DOCUMENTS

| | | | |
|---|---|---|---|
| 2014/0355633 A9* | 12/2014 | Geschwandner | H01S 3/036 372/34 |
| 2017/0211889 A1* | 7/2017 | Schwalm | F28F 3/08 |
| 2019/0107342 A1 | 4/2019 | Romanin et al. | |
| 2020/0238452 A1 | 7/2020 | Rutkowski et al. | |

FOREIGN PATENT DOCUMENTS

| | | | | |
|---|---|---|---|---|
| CN | 207180437 U | * | 4/2018 | |
| JP | 2020071008 A | * | 5/2020 | |
| WO | WO-9924772 A1 | * | 5/1999 | ............ F28D 9/0037 |

OTHER PUBLICATIONS

T'Joen, et al., "A review on polymer heat exchangers for HVAC&R applications", International Journal of Refrigeration, vol. 32, 2009, pp. 763-779.

Emergent Coils, https://cdn.shopify.com/s/files/1/0028/4753/9266/files/24x24_-_PR.pdf?47691194689317828, Jun. 25, 2018, 1 page.

Patel, A.B., et al., Science Direct, vol. 40, Issue 2, Feb. 1, 2000, pp. 91-98.

Harris, Chad, et al., "Fabrication, modeling, and testing of micro-cross-flow heat exchangers," in Journal of Microelectromechanical Systems, vol. 11, No. 6, Dec. 2002, pp. 726-735.

Malik, T, et al., "Suitability of Polymer Heat Exchangers for Air Conditioning Applications", University of Illinois at Urbana-Champaign, Project #148, Mar. 2005, pp. 1-24.

Cheng, Lixin, et al., "Experimental Study of Heat Transfer and Pressure Drop Characteristics of Air/Water and Air-Steam/Water Heat Exchange in a Polymer Compact Heat Exchanger", Heat Transfer Engineering, vol. 26, 2005, pp. 18-27.

Park, Younggil, et al., "Polymer-Tube-Bundle Heat Exchanger for Liquid to-Gas Applications", Purdue University, School of Mechanical Engineering, International Refrigeration and Air Conditioning, Jul. 14-17, 2008, pp. 1-9.

Chen, Li, et al., "Experimental investigation of plastic finned-tube heat exchangers, with emphasis on material thermal conductivity", Science Direct, vol. 33, Issue 5, Jul. 2009, pp. 922-928.

Smith, Kevin Michael, et al., "Development of a plastic rotary heat exchanger for room-basedventilation in existing apartments", Energy and Buildings, vol. 107, Nov. 15, 2015, pp. 1-10.

Ghosh, Bidisha, et al., "Design and Investigation into the Thermal and Mechanical Performance of a Polymer Composite Prototype Gas-Liquid Heat Exchanger", International Journal of Thermal and Environmental Engineering, vol. 11, No. 1, 2016, pp. 51-59.

* cited by examiner

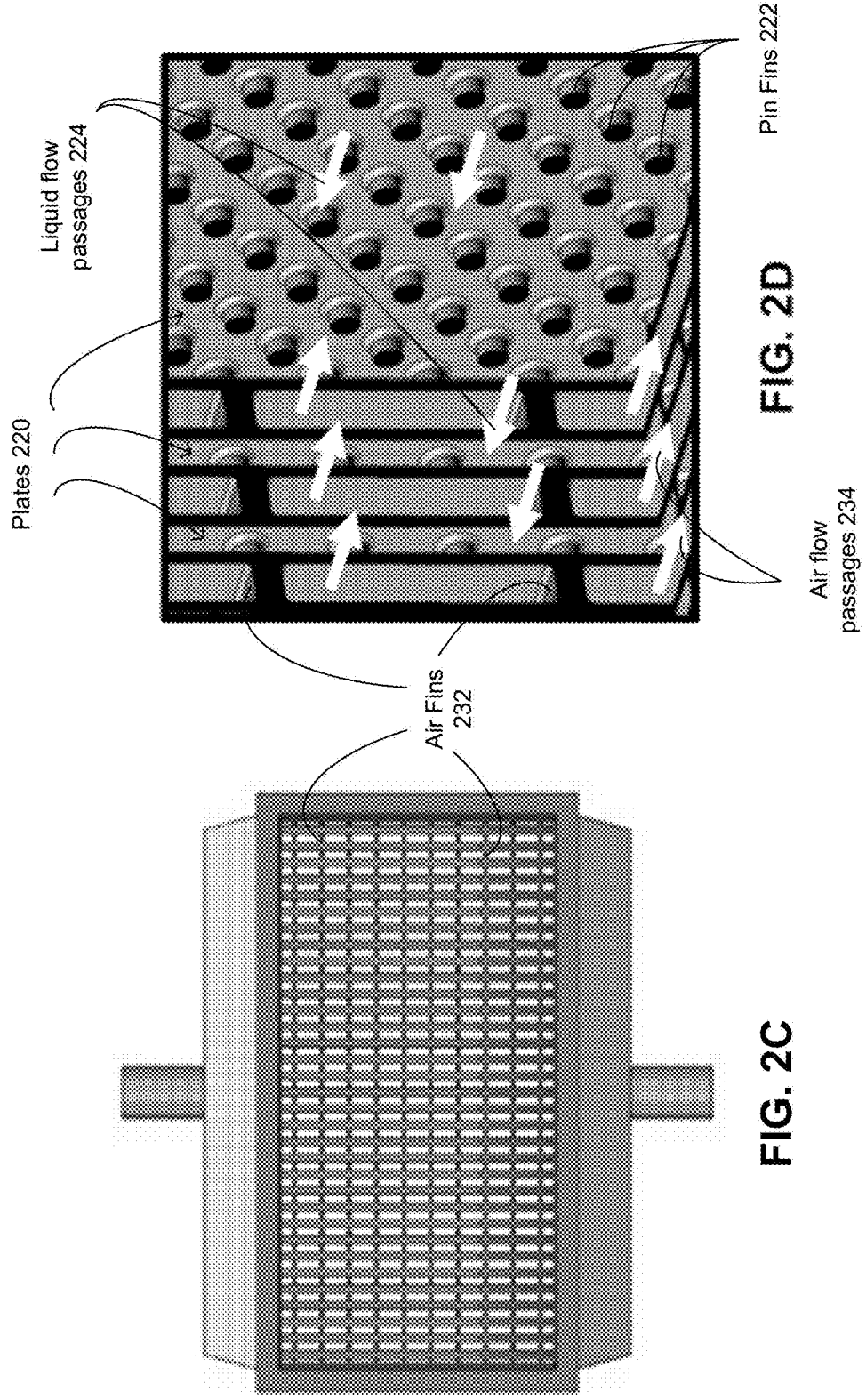

LOW-DRAG, HIGH-EFFICIENCY MICROCHANNEL POLYMER HEAT EXCHANGERS

CROSS-REFERENCE TO RELATED APPLICATION

This application claims the benefit of U.S. Provisional Patent Application Ser. No. 62/960,625, entitled "Microchannel Polymer Heat Exchangers," by inventors Vinod Narayanan and Erfan Rasouli, filed on 13 Jan. 2020, the contents of which are incorporated by reference herein.

GOVERNMENT LICENSE RIGHTS

This invention was made with U.S. government support under grant number N000141712811 awarded by the Office of Naval Research (ONR). The U.S. government has certain rights in the invention.

BACKGROUND

Field

The disclosed embodiments generally relate to the design of heat exchangers for heating and cooling applications. More specifically, the disclosed embodiments relate to the design of a high efficiency polymer heat exchanger with microscale flow passages, which is suitable for 3D printing and injection molding manufacturing processes.

Related Art

Conventional air conditioning systems consume a large amount of energy and also suffer from refrigerant leakage issues. Refrigerant leakage produces detrimental effects because commonly used refrigerants, such as R-22, have high global warming potentials (GWPs). For this reason, governmental agencies have put into place various regulations and incentives to phase down the use of high GWP refrigerants and to move toward the use of low GWP refrigerants.

Low GWP refrigerants (which include HFC-32, HFC-152a, natural refrigerants such as ammonia and hydrocarbons such as propane) provide significant environmental benefits; however, they are flammable. Hence, in the interest of safety, they are best kept in hermetically, factory-sealed heat pump packages outside of a building. With this approach, a secondary fluid, such as water, is needed to transfer heat between an air handler (AH) located inside of the building, and a refrigeration system containing the low GWP refrigerant located outside of the building. In a typical finned-tube heat exchanger (FTHX), which is commonly used in such systems, a cross-counter flow configuration is used, wherein water flows in a perpendicular direction to the air-flow in tubes, and fins surrounding the tubes are used to enhance surface area between the tubes and the air. Such a cross-counter flow configuration achieves less heat-transfer efficiency than other possible designs, but is easier and more economical to manufacture.

Considering recent advances in manufacturing techniques, what is needed is a heat exchanger for use in heating and cooling systems, which provides high heat-transfer efficiency at low pressure drop (fan power) and is also economical to manufacture.

SUMMARY

The disclosed embodiments relate to a system that implements a polymer heat exchanger with microscale flow passages. The system includes a set of plates comprised of a polymer that includes internal microscale flow passages, which are configured to carry a liquid. The set of plates is organized into a stack, wherein consecutive plates in the stack are separated by fins to form intervening air passages. The system includes a liquid flow pathway, which flows from a liquid inlet, through the internal microscale flow passages in the stack of plates, to a liquid outlet. It also includes an airflow pathway, which flows from an airflow inlet, through the intervening air passages between the consecutive plates in the stack of plates, to an airflow outlet. The liquid flow pathway flows in a direction opposite to a direction of the airflow pathway to provide a counterflow design that optimizes heat transfer between the liquid flow pathway and the airflow pathway.

Although this system is described as exchanging heat between a liquid and air, it can also be used to exchange heat between two liquids because the air in this heat exchanger essentially functions as a liquid with a lower density.

Although this polymer heat exchanger (HX) provides advantages when used in low GWP refrigerant systems, use of this HX is not limited to low GWP refrigerant systems. In general, any air conditioning system that provides heating or cooling load to indoor spaces via heated or chilled liquid (water or glycol) can benefit from this HX. For example, there exist roof top central chillers, which are located in commercial buildings, hospitals, hotels, etc., that provide chilled water to buildings for cooling indoor air. There are also exist central gas fired or solar water heaters that provide hot water. In these types of systems, forced air heating and/or cooling systems direct chilled water or hot water through conventional finned tube heat exchangers (FTHX) to condition the indoor air. Our new polymer HX can be used to replace these FTHXs to improve the overall efficiency and lower pressure drop and hence fan power.

In some embodiments, the system is used in industrial processes to efficiently extract low grade waste heat from gaseous heat sources such as steam and flue gas at temperatures below 100° C. to a liquid, which could be corrosive.

In some embodiments, the system is used to measure the flow rate of air by measuring a pressure drop across the heat exchanger (HX), wherein the pressure drop is used to continuously monitor the state of the HX to determine whether it needs to be serviced.

In some embodiments, in a heating and/or cooling split systems where the heat transfer liquid is directed to small HX units located in different zones of an indoor space while the air flow is provided by a central fan, real-time flow rate measurement across the HXs can serve as a useful monitoring tool to ensure balanced air flow distribution throughout the indoor space by sending flow rate feedback to the integrated duct dampers. In addition to enhancing user comfort and energy saving, this feature can be used to provide continuous HVAC commissioning rather than one time commissioning that might not be done properly.

In some embodiments, the fins that separate consecutive plates in the stack of plates are formed by protrusions, which are manufactured onto outer surfaces of the set of plates.

In some embodiments, the fins that separate consecutive plates are configured to be one or more of: straight, interrupted and contoured.

In some embodiments, the internal microscale flow passages within the set of plates include arrays of microscale pin fins to facilitate heat transfer and liquid flow distribution.

In some embodiments, pins that comprise the array of microscale pins are configured to be one or more of: circular, airfoil-shaped and twisted.

In some embodiments, the polymer heat exchanger is part of a heating and/or cooling system for a building. This heating and/or cooling system includes an external heat pump located outside of the building, which uses a low global warming potential (GWP) refrigerant. It also includes a refrigerant-to-liquid heat exchanger located outside of the building, which exchanges heat between the low GWP refrigerant from the external heat pump and a heat-transfer liquid. It additionally includes the polymer heat exchanger located inside the building, which exchanges heat between the heat-transfer liquid from the refrigerant-to-liquid heat exchanger and air, which flows through a heating and/or cooling system in the building.

In some embodiments, each plate in the set of plates is designed to be fabricated through an injection molding process, wherein a top surface and/or a bottom surface of the plate are formed through injection molding, and the top surface and the bottom surface are bonded together to form the plate, which includes the internal microscale flow passages.

In some embodiments, each plate in the set of plates is designed to be manufactured through an additive manufacturing process.

In some embodiments, each plate in the set of plates includes features that form a plenum, wherein when plates in the set of plates are stacked together, the plena in the individual plates form a continuous plenum, which is configured to carry liquid from the liquid inlet to the internal microscale flow passages, and from the internal microscale flow passages to the liquid outlet.

In some embodiments, the cross-sectional shape of the continuous plenum, which is the only blunt object in the air stream, can be contoured like (but is not limited to) an shape to minimize drag forces and consequently reduce airflow pressure losses while passing across the heat exchanger. (Note that our system does not include any cross-flow blunt objects in the air stream, such as tubes in a finned tube HX. The only objects in cross-flow are the low-drag plena for scale up. This feature of the HX that lends to a low pressure drop.)

In some embodiments, the stacked set of plates forms a heat exchanger module that provides a duct for airflow for the airflow pathway, wherein the system includes multiple heat exchanger modules, which are stacked in one or more dimensions orthogonal to a direction of the airflow to form a larger duct assembly.

In heating and/or cooling split systems, single or multiple heat exchanger modules, which are stacked in one or more dimensions orthogonal to a direction of the airflow, can be plumbed into the ducts carrying the airflow into different indoor space zones.

In some embodiments, the liquid in the polymer heat exchanger comprises water or glycol.

In some embodiments, the internal microscale flow passages in the set of plates are 0.25 mm to 1.0 mm or less in width.

The disclosed embodiments also provide a process for fabricating a polymer heat exchanger with microscale flow passages. During this process, a set of plates is fabricated using a polymer, wherein the set of plates includes internal microscale flow passages, which are configured to carry a liquid. Next, the set of plates is organized into a stack, wherein consecutive plates in the stack are separated by fins to form intervening air passages. The process also involves forming a liquid flow pathway, which flows from a liquid inlet, through the internal microscale flow passages in the stack of plates, to a liquid outlet. The process additionally involves forming an airflow pathway, which flows from an airflow inlet, through the intervening air passages between the consecutive plates in the stack of plates, to an airflow outlet. The liquid flow pathway flows in a direction opposite to a direction of the airflow pathway to provide a counterflow design that optimizes heat transfer between the liquid flow pathway and the airflow pathway.

In some embodiments, an additive manufacturing process is used to fabricate each plate in the set of plates.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 2C presents a front view of the polymer heat exchanger in accordance with the disclosed embodiments.

FIG. 2D illustrates internal channel details for the polymer heat exchanger in accordance with the disclosed embodiments.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Discussion

Figure 1:
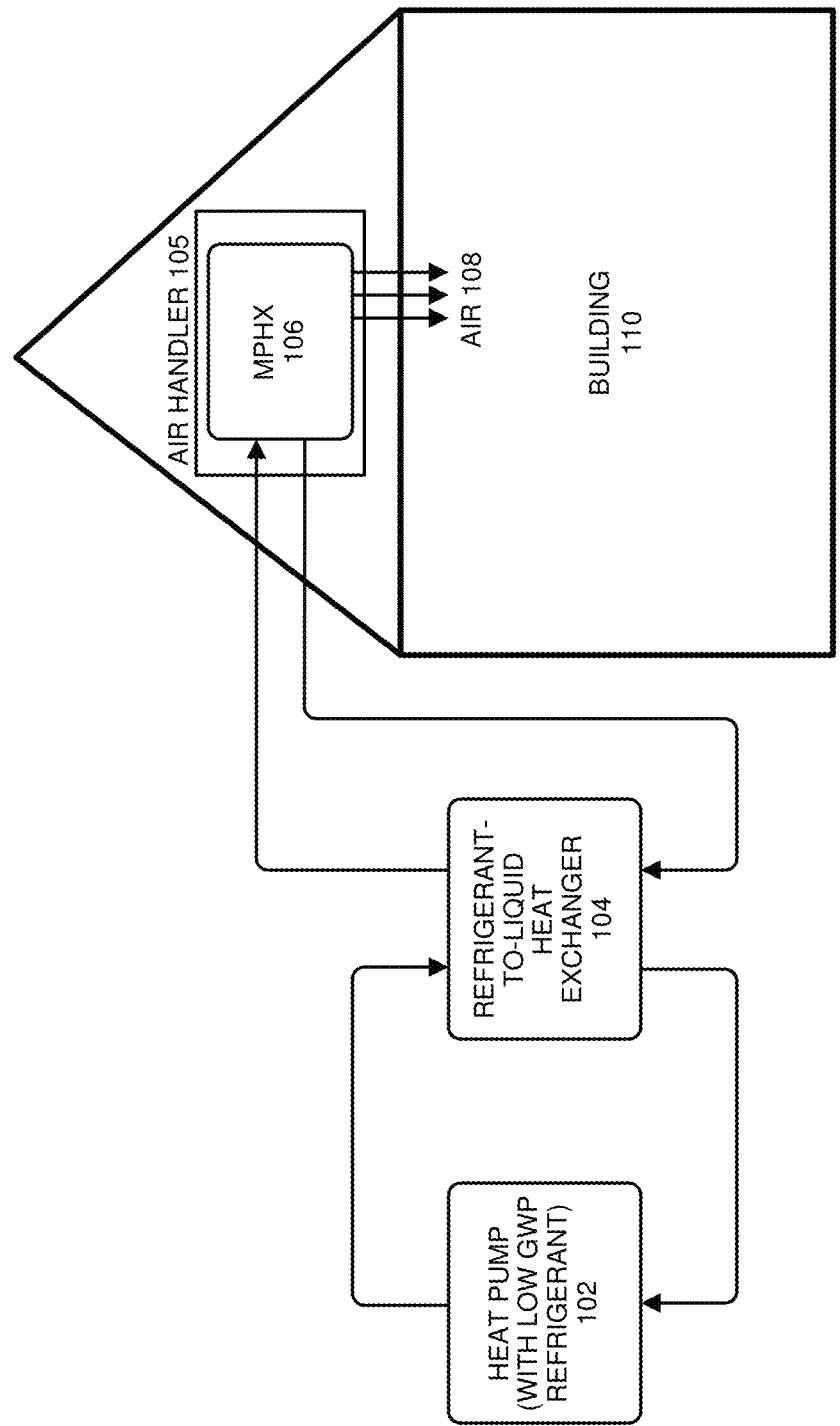
FIG. 1 illustrates an exemplary centralized heating and cooling system, which includes an external heat pump with a low GWP refrigerant in accordance with the disclosed embodiments.

Referring to FIG. 1, a modern heating and/or cooling system for a building includes an external heat pump 102 located outside of the building, which uses a low global warming potential (GWP) refrigerant. It also includes a refrigerant-to-liquid heat exchanger 104 located outside of the building, which exchanges heat between the low GWP refrigerant from the external heat pump 102 and the water. It additionally includes an air handler 105 with a micro-channel polymer heat exchanger (MPHX) 106 located inside the building, which exchanges heat between the water from the refrigerant-to-liquid heat exchanger 104 and internal air 108, which flows through a heating and/or cooling system in the building 110.

Figure 2A:
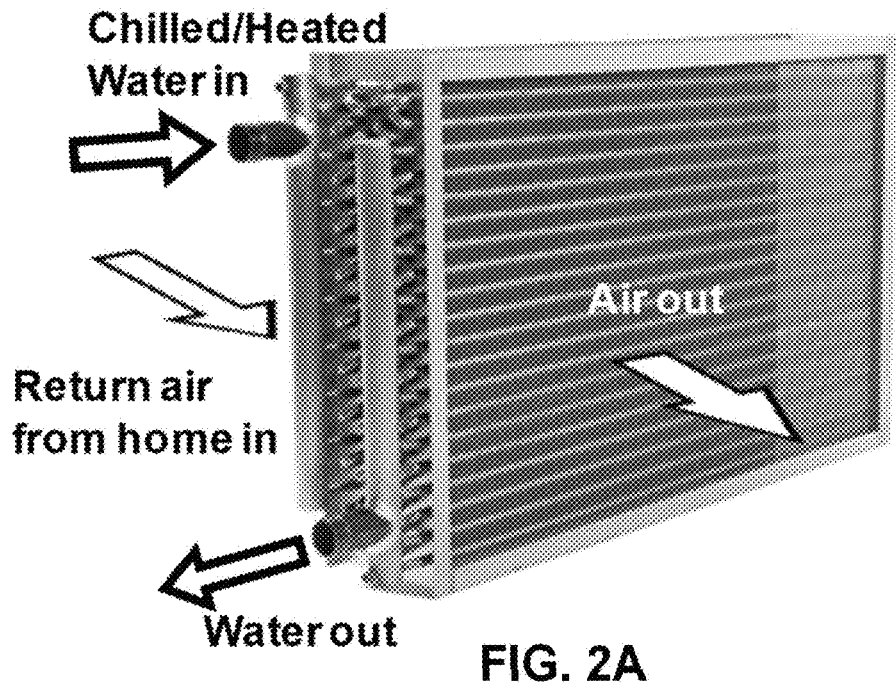
FIG. 2A illustrates a conventional air-to-water heat exchanger.

Heat exchangers (HXs) can be classified as "counterflow" or "crossflow" depending on the direction of the passage of fluid within the HX. In a counterflow HX, the most efficient configuration, hot and cold fluids flow in opposite directions. The performance of a HX is defined in terms of "effectiveness," which is the ratio of actual exchanged heat to the maximum possible heat transfer rate. The maximum exchanged heat rate would be attained in an infinitely long counterflow HX. Thus, a higher effectiveness HX can transfer the same amount of heat in a smaller size. Note that the HX flow configuration does not matter for a refrigerant-to-air evaporator HX, wherein the refrigerant undergoes a phase change (boiling), as the effectiveness is independent of the refrigerant side because the temperature is saturated. However, the configuration of a water-to-air HX, such as MPHX 106, is important in determining its effectiveness. As is illustrated in FIG. 2A, in a typical finned-tube water coil HX (FTHX), which exists in conventional air handlers, a cross-counter flow configuration is used wherein water flows perpendicular to air-flow in tubes, wherein fins are used around the tubes on the air side to enhance surface area. Such a cross-counter flow configuration is less effective than counterflow but is easier to manufacture. In fact, the effectiveness of current state-of-the-art chilled water-to-air HX, with chilled water inlet temperature of 45° F. is only up to 0.7 under typical operating conditions.

FTHXs are also prone to performance degradation due to either air-side cloggage by dirt and/or dust, or water-side pollutants that cause corrosion and deposition of dissolved minerals on copper tubes. There are also numerous incidents of leakage of refrigerant or water from FTHXs due to severe corrosion. Note that organic acids and even regular household cleaners, solvents, paints, and carpet glue can travel into the air conditioning system and pass across the copper coil in the AH. The condensate on the coil provides a suitable environment for the mix of chemicals to initiate a reaction (known as formicary corrosion) with copper, which forms holes that branch into tunnels, and can penetrate into the tube wall resulting in leakage.

Figure 2B:
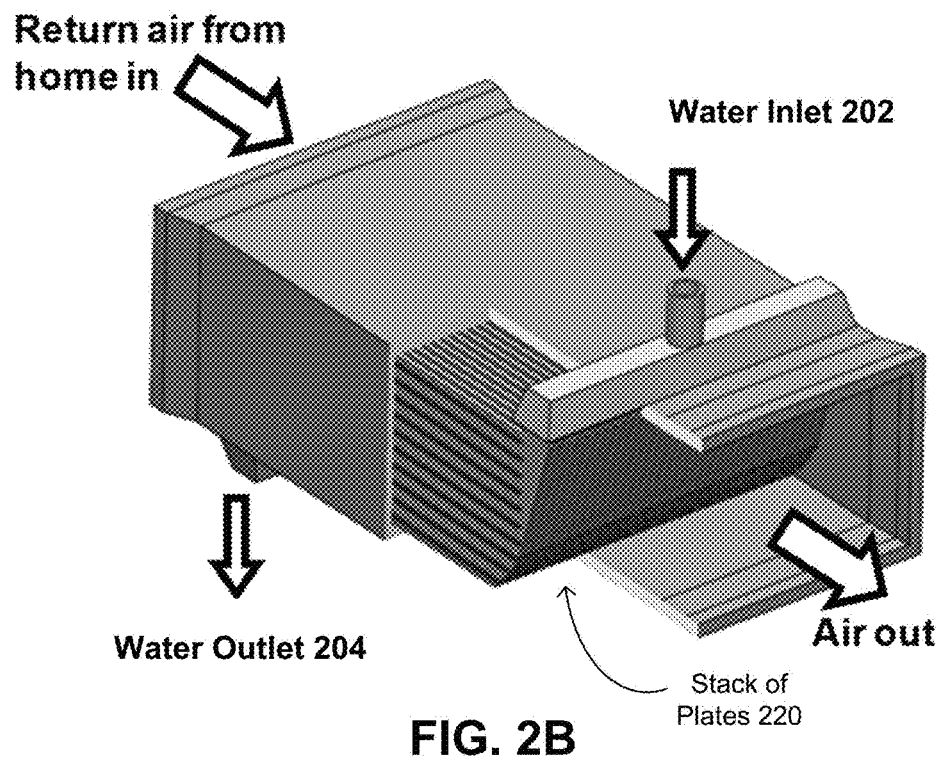
FIG. 2B illustrates a polymer heat exchanger with microscale flow passages in accordance with the disclosed embodiments.

Our new microchannel polymer heat exchanger (MPHX) design is illustrated in FIG. 2B. (A front view of the printed MPHX showing honeycomb air passages appears in FIG. 2C.) In contrast to a cross-flow finned tube design, a plate-type design is used wherein each fin in the traditional finned tube heat exchanger becomes a "water plate" 220 through which water flows directly. As depicted in the cut-away view of the plates in FIG. 2D, the MPHX comprises several water plates 220 spaced a certain distance (Sp) apart and connected to distributer and collector water manifolds. The water manifolds are located on either end of the water plates 220, and water is directed into each plate through designated openings and is distributed by using elongated flow distribution structures at the inlet and exit regions (e.g., water inlet 202 and water outlet 204 in FIG. 2B). Note that the water stream flows through an array of microscale pin fins 222 within each plate 220. A pin fin architecture (see detail in FIG. 2D) is used for the microscale regions since it leads to a higher heat transfer rate and better flow distribution than parallel microscale flow passages. As seen in FIGS. 2B and 2D, the plates are linked together using common inlet and exit headers. Return air flows around and in between the plates. To enhance the heat transfer coefficient on the air side, other fin structures are designed on the outer surface of the water plates (e.g., air fins 232 in FIG. 2D). (See also FIGS. 2B and 2C.)

Several important parameters play a role in determining the overall size of the MPHX, such as cross-sectional dimensions of the duct carrying return air, water plate spacing, fin spacing, water plate pin fin geometry design, hot and cold flow inlet temperatures, heat load capacity, MPHX material, and 3D printing technology limitations.

Small-Scale MPHX Design

Figure 3B:
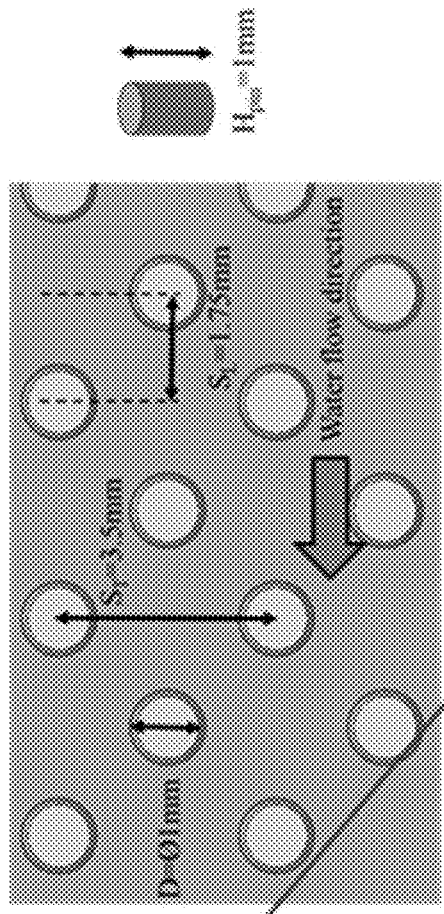
FIG. 3B illustrates pin fin dimensions and spacings for the water plate in accordance with the disclosed embodiments.
Figure 3A:
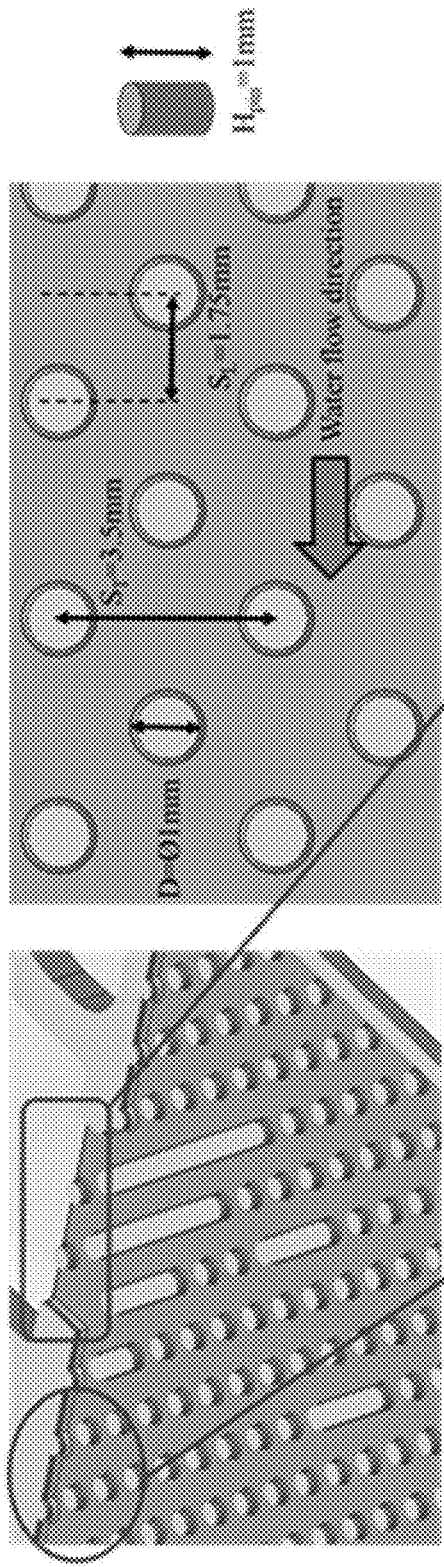
FIG. 3A illustrates the internal architecture of a single water plate in accordance with the disclosed embodiments.

Based on the general concept of the MPHX, a small-scale unit was designed, fabricated and characterized. The design of the water plate is important for the structural integrity of the MPHX. The headers and water plates were designed to enable good flow distribution and withstand the internal water loop pressure. As shown in FIG. 3A, within each water plate microchannel two types of micro structures provide structural support against internal system pressure, wherein the system is designed for a water loop pressure of 10 bar. The microstructures in the inlet and outlet regions of a water plate are designed such that flow is distributed uniformly along the width of the plate. The rest of the water plate is comprised of a pin array. The design of micro pin fins along the length of the cold plate is important in enhancing heat transfer and determining subsequent water pressure drop.

Figure 3D:
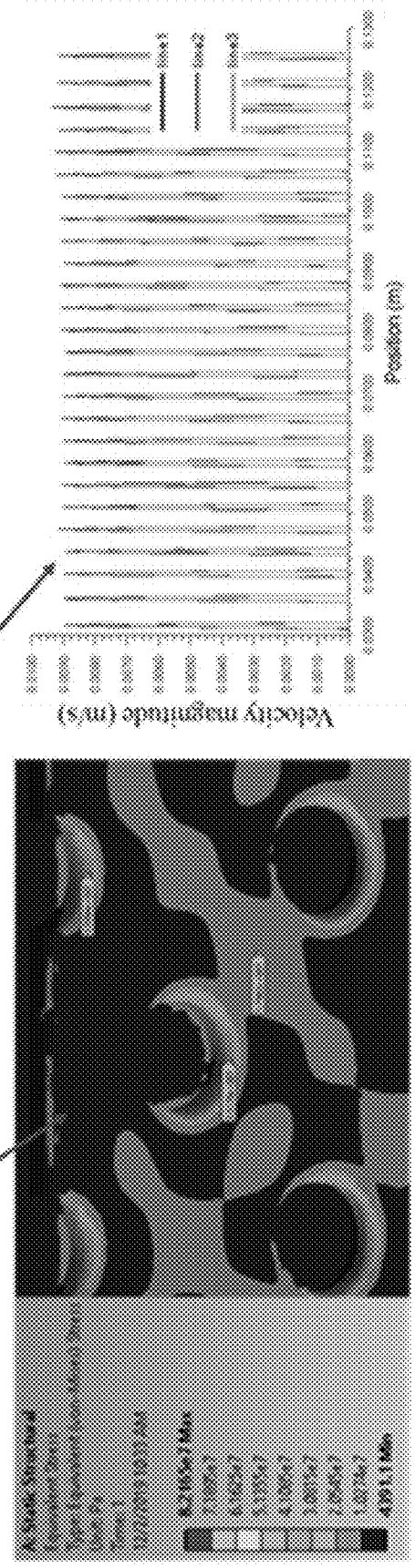
FIG. 3D presents a graph of velocity magnitude at the inlet of the water plate assembly in accordance with the disclosed embodiments.
Figure 3C:
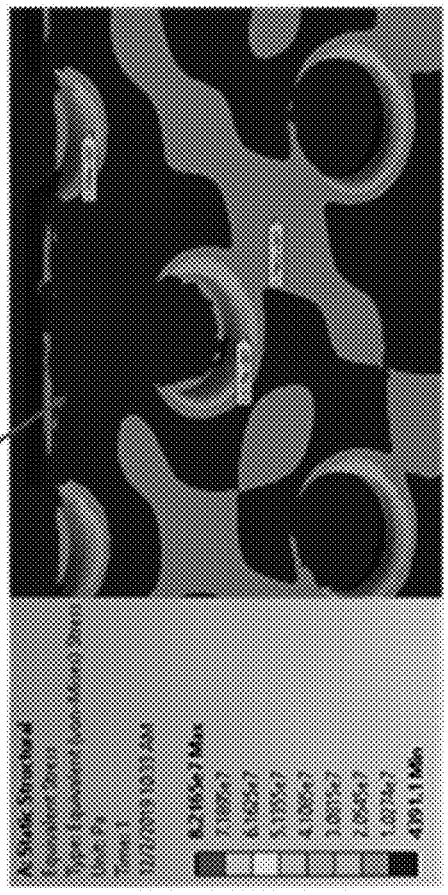
FIG. 3C illustrates equivalent Von-Mises stress contours within the pin array region in accordance with the disclosed embodiments.
Figure 4A:
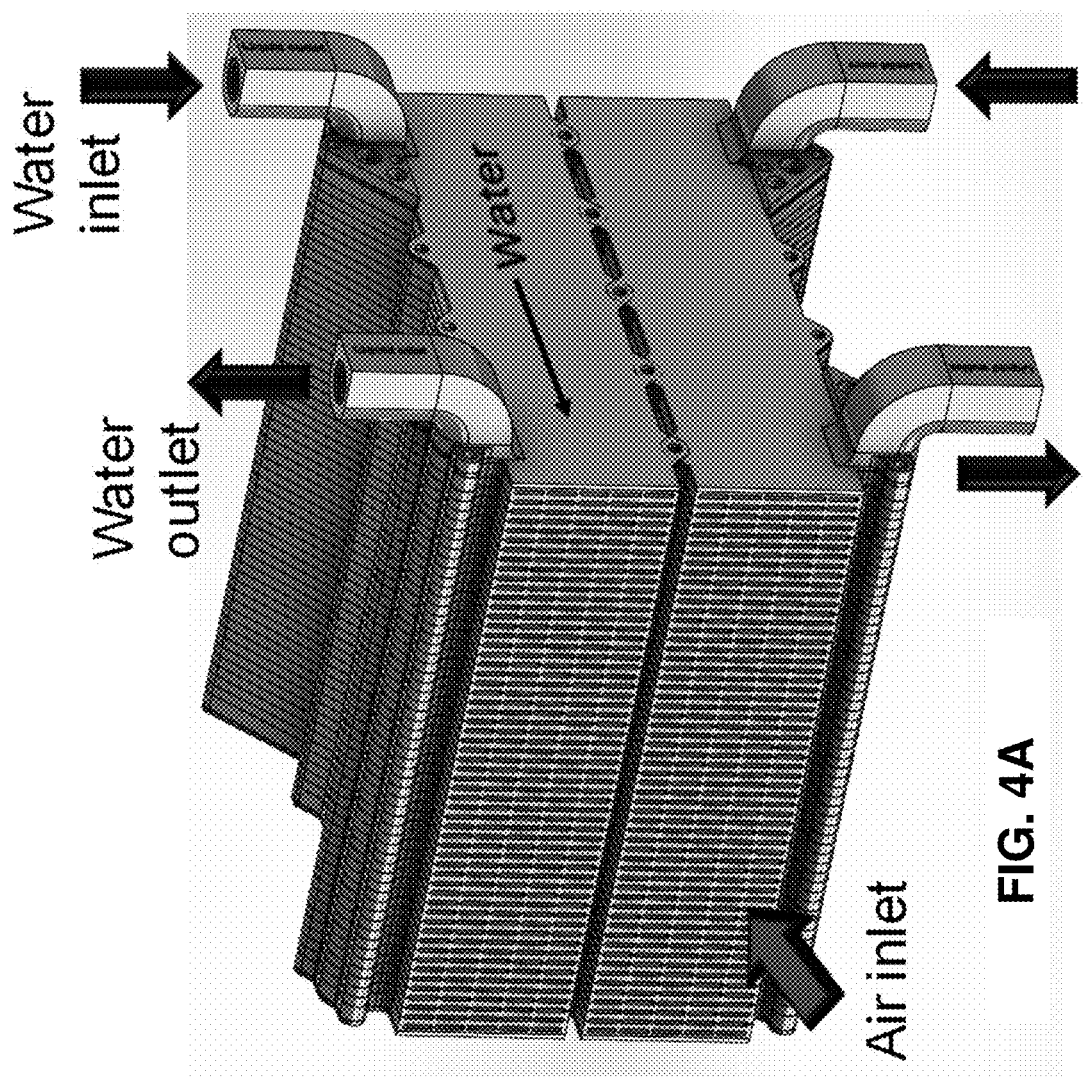
FIG. 4A illustrates a 3D printed polymer heat exchanger in with microscale flow passages with integrated plena in each plate that interconnect together to form a single inlet and exit plenum accordance with the disclosed embodiments.
Figure 4B:
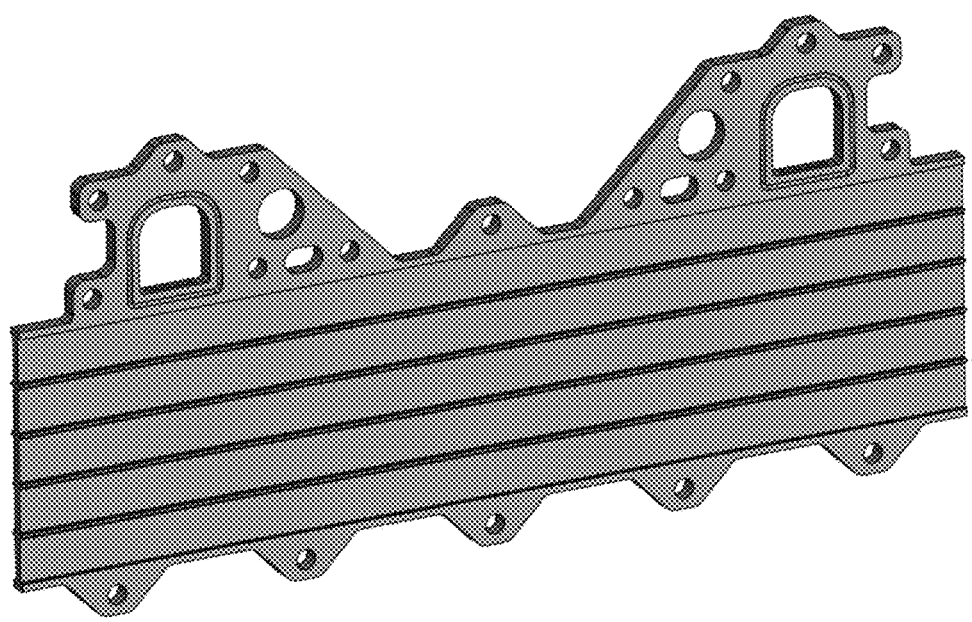
FIG. 4B illustrates a 3D printed water plate for a polymer heat exchanger with microscale flow passages in accordance with the disclosed embodiments.
Figure 4C:
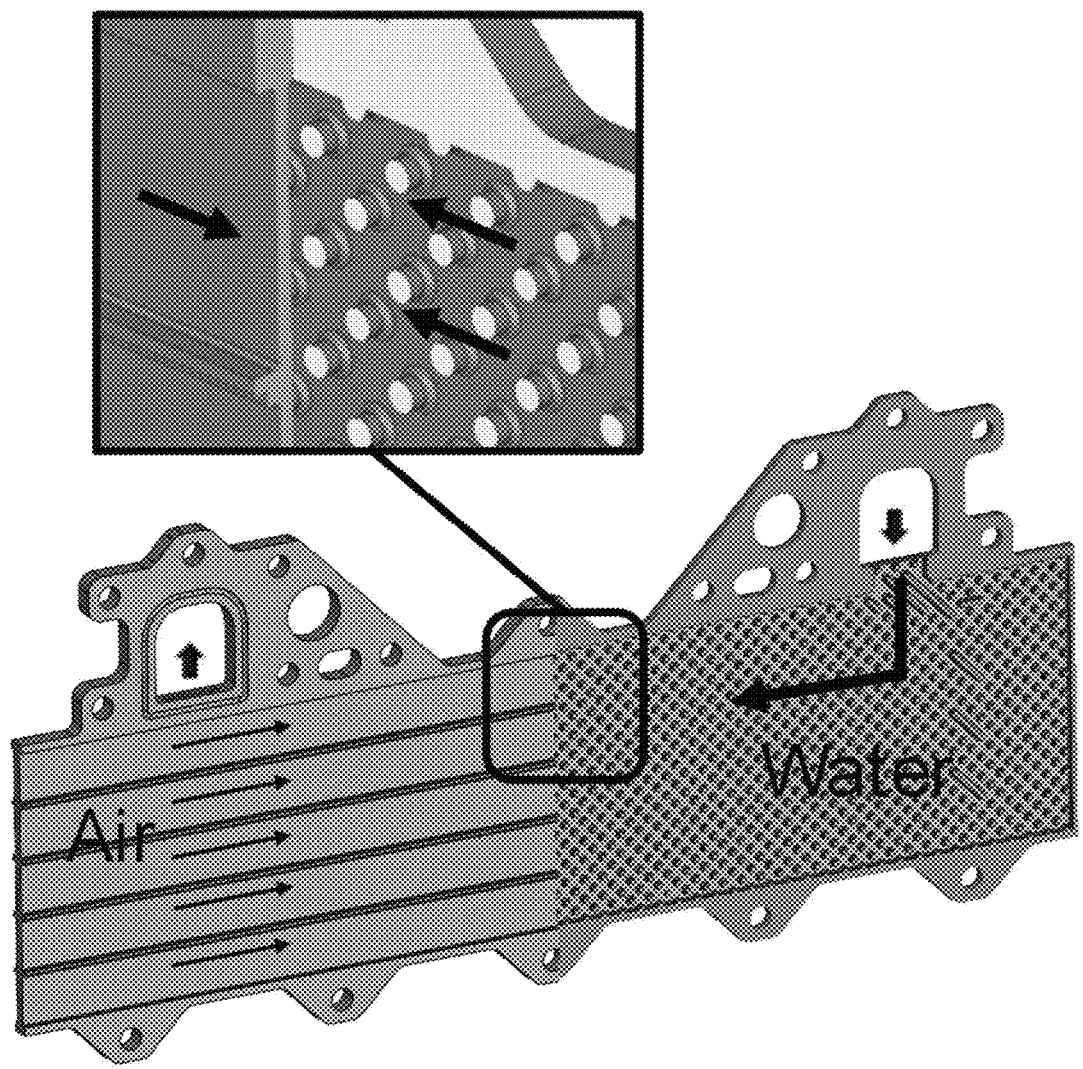
FIG. 4C presents a cut-away view of a 3D printed water plate for a polymer heat exchanger with microscale flow passages in accordance with the disclosed embodiments.
Figure 5A:
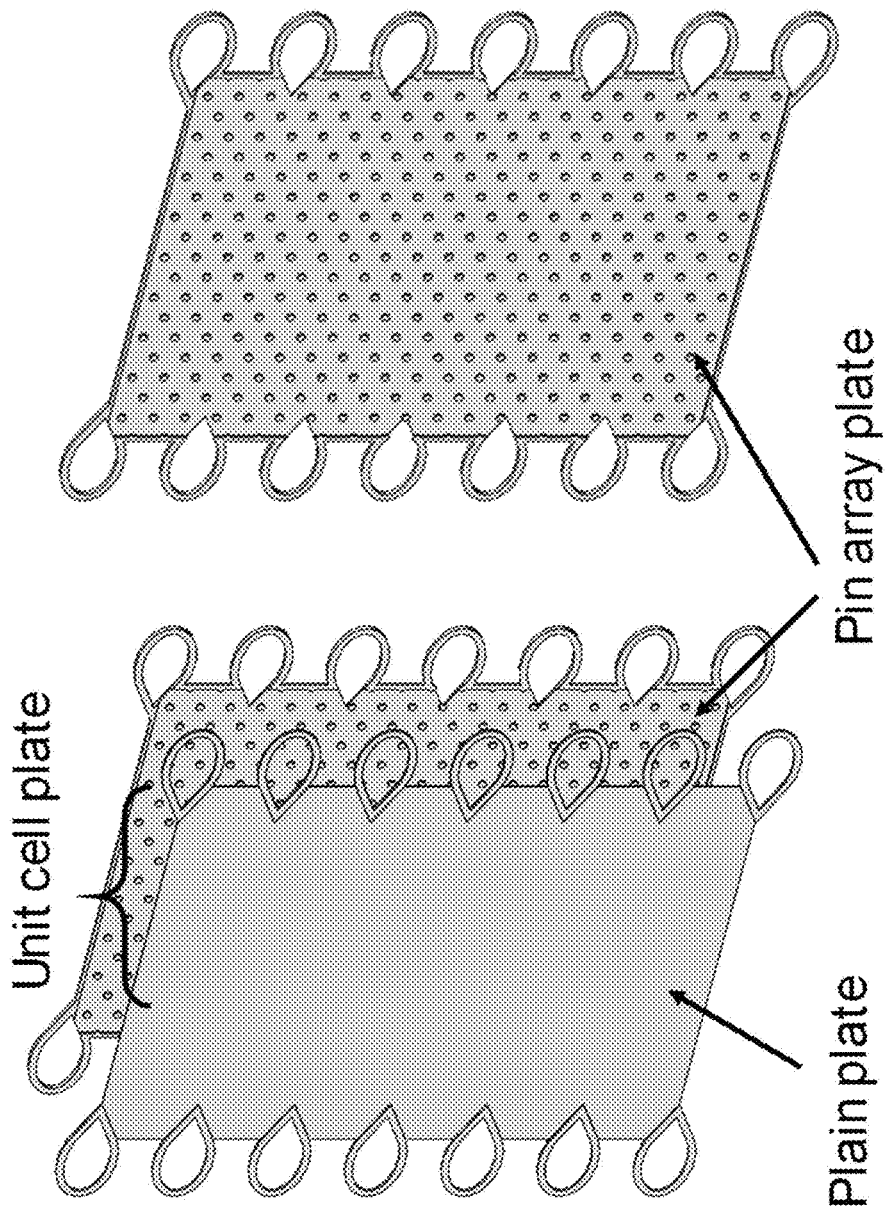
FIG. 5A illustrates an injection-molded unit cell plate for a polymer heat exchanger with microscale flow passages in accordance with the disclosed embodiments.
Figure 5B:
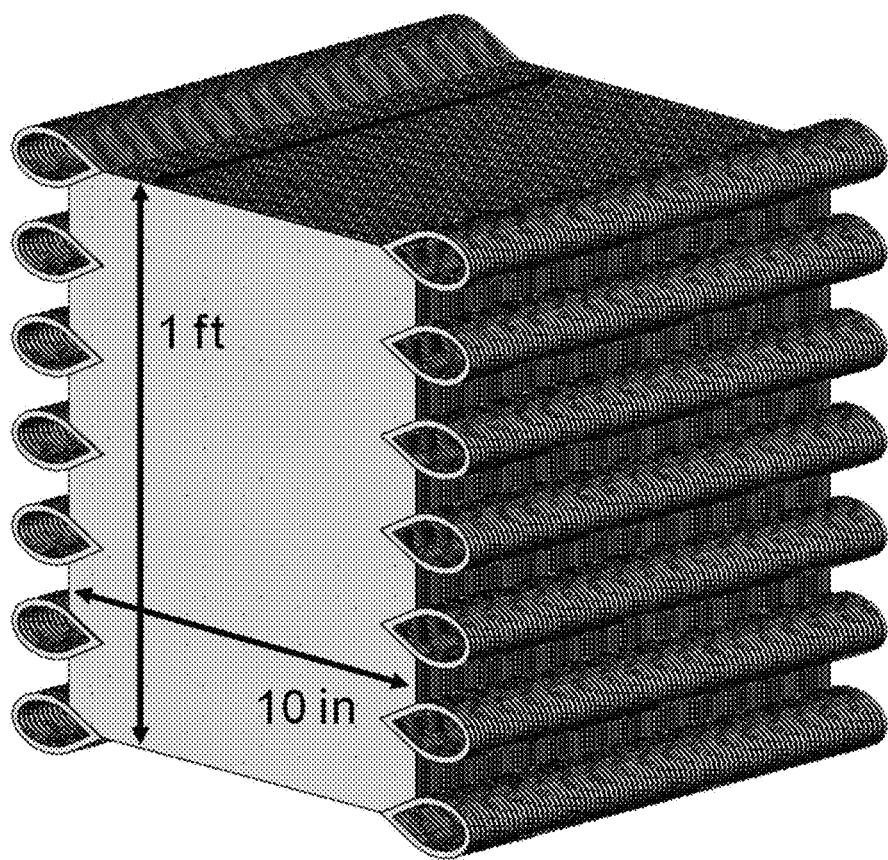
FIG. 5B illustrates how injection-molded unit cell plates are stacked together to form a polymer heat exchanger module in accordance with the disclosed embodiments.
Figure 5C:
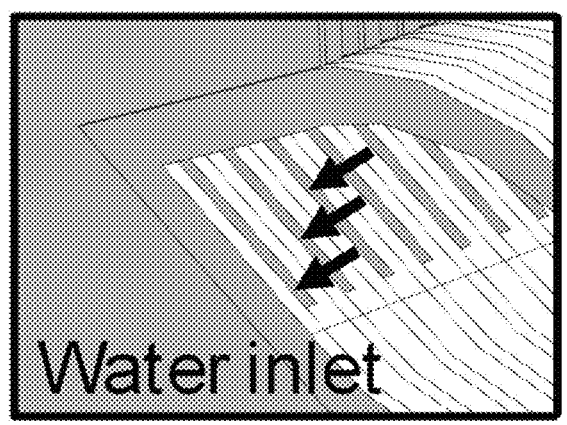
FIG. 5C presents a detailed view illustrating water inlets in a plenum, which is part of a polymer heat exchanger module formed by stacking injection-molded unit cell plates in accordance with the disclosed embodiments.
Figure 5D:
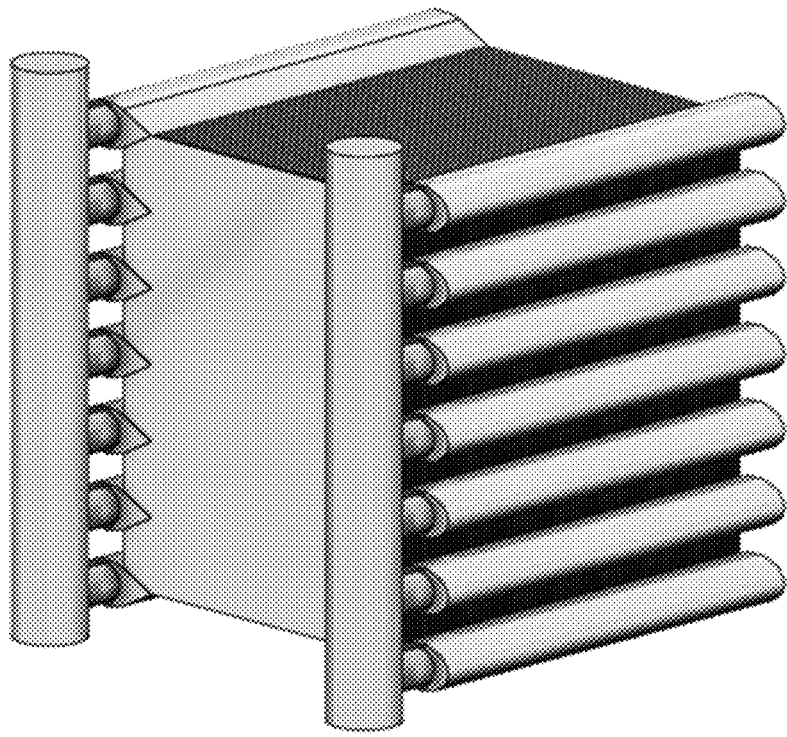
FIG. 5D illustrates how the polymer heat exchanger module illustrated in FIG. 5C is connected to water inlet and outlet pipes to form a module in accordance with the disclosed embodiments.
Figure 5E:
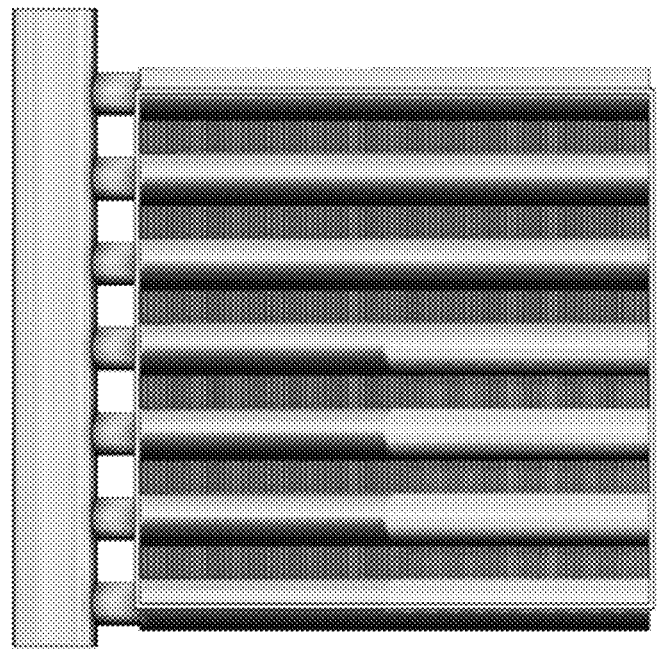
FIG. 5E presents a view through the duct of the polymer heat exchanger module illustrated in FIG. 5D in accordance with the disclosed embodiments.
Figure 5F:
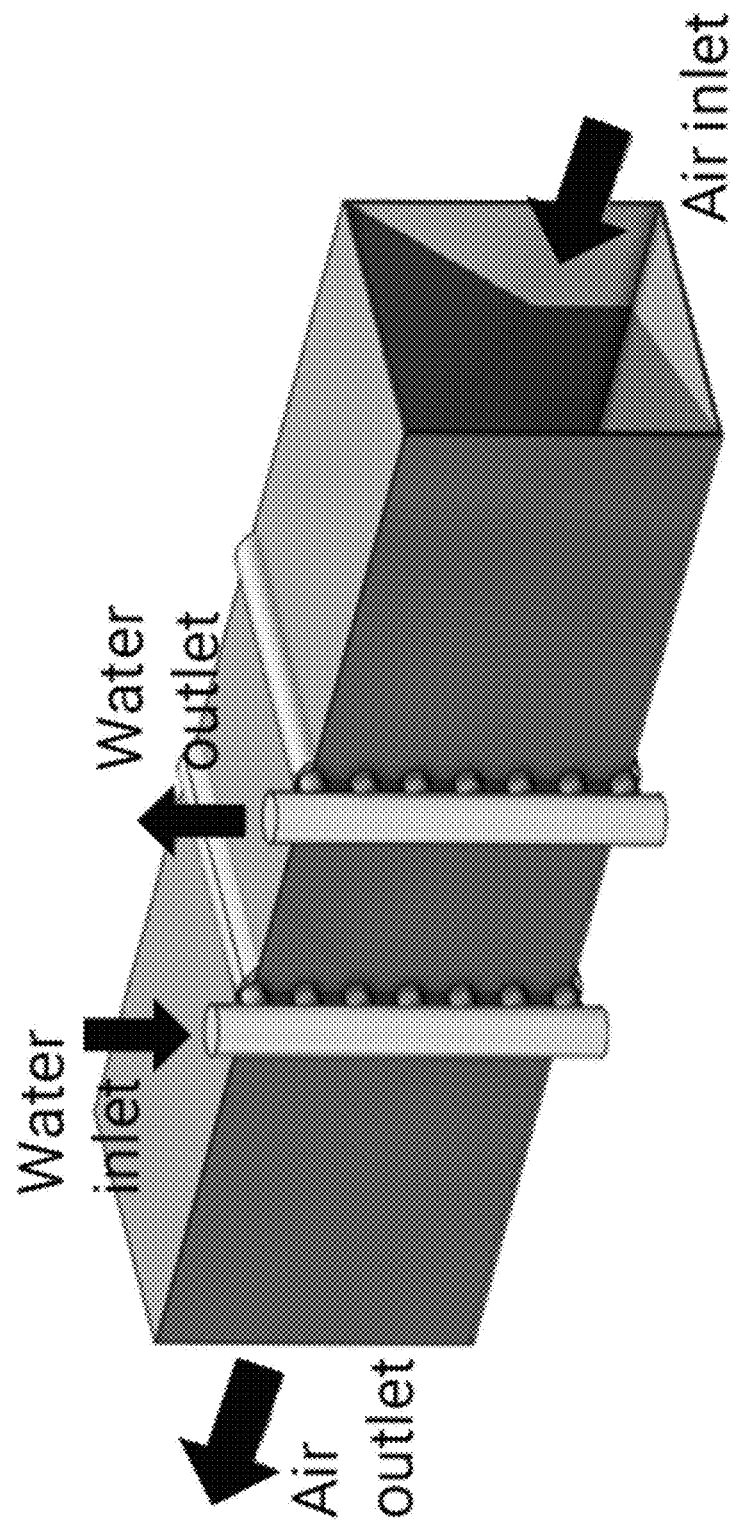
FIG. 5F illustrates how the polymer heat exchanger module illustrated in FIG. 5D is connected to an air inlet and an air outlet in accordance with the disclosed embodiments.
Figure 5G:
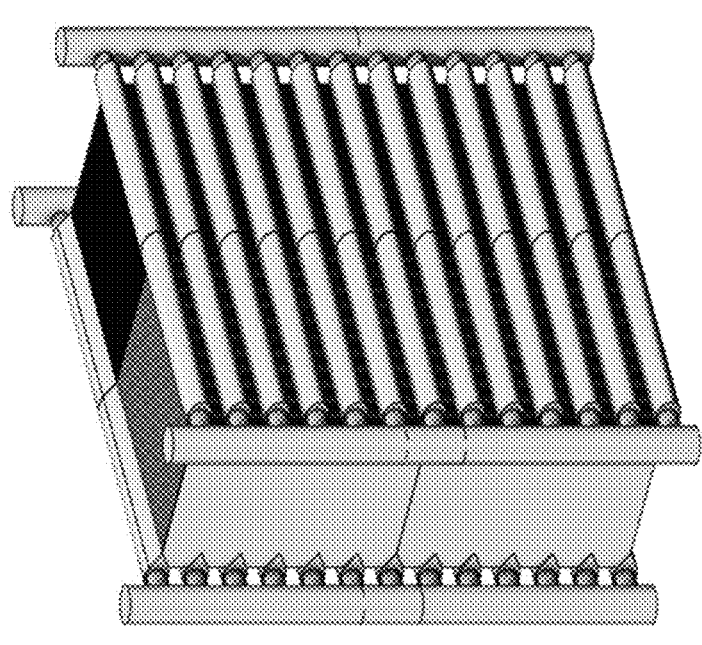
FIG. 5G illustrates how four of the polymer heat exchanger modules illustrated in FIG. 5D can be connected to form a larger polymer heat exchanger in accordance with the disclosed embodiments.
Figure 5H:
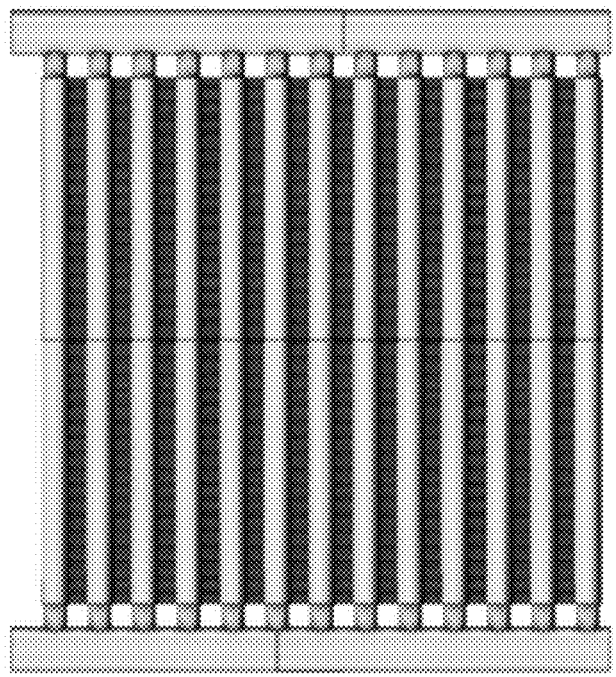
FIG. 5H presents a view through the duct of the larger polymer heat exchanger module illustrated in FIG. 5G in accordance with the disclosed embodiments.

In order to arrive at a viable header and plate design capable of withstanding an internal pressure of 10 bar while having uniform flow distribution, structural and computational CFD analyses were iteratively performed. First, mechanical integrity simulations were performed. An absolute pressure of 10 bar was imposed on all the internal surfaces, while the outer exposed surfaces were left at atmospheric pressure (1 bar). The resulting selected pin fin dimensions following several iterations are shown in FIG. 3B. The corresponding stress values on pin fins due to 10 bar internal pressure is shown in FIG. 3C. The tensile yield strength of EPX 82 resin at 20° C. is 82 MPa. The mechanical simulations showed that the equivalent stress almost everywhere within the water plate was below 50 MPa. Upon verification of the structural aspects of the design, CFD simulations were performed to ensure uniform flow distribution from the header into each water plate and across the plates. For the lower limit (worst-case scenario for flow distribution) inlet mass flow rate to each water plate of ~0.04 g/s, the velocity magnitude at the inlet of the water plate assembly (26 plates to form a 4 in wide MPHX) is shown in FIG. 3D. As shown in FIG. 3A, two pin fins are located at the inlet region for structural integrity. These pins divide the incoming stream into three sections. FIG. 3D presents a graph illustrating the velocity magnitude of the cell elements located on three lines that connect the centerline of corresponding open sections on water plate assembly. High velocity magnitudes belong to those cell elements located in mid distance from two adjacent walls, and by moving toward the walls due to no-slip boundary conditions, the velocity decreases to zero value. The overall velocity magnitude profile shown in FIG. 3D indicates acceptable distribution of flow from the header into the water plate assembly.

Small-Scale MPHX fabrication

A Continuous Liquid Interface Production (CLIP) 3D printing technique was used to fabricate a small-scale MPHX. In this technique, the 3D model of the MPHX was projected in a successive series of UV images from part cross section through an oxygen-permeable window into a reservoir containing UV-curable resin. As a sequence of UV images was projected, the projected cross sections of MPHX solidified layer by layer while the build platform was pulling out the solid body. Advantages of this printing technique include: short print time; capability of printing complex geometries with internal porosity; better mechanical properties even at higher temperatures (cyanate ester resin with 231° C. heat deflection temperature); and very fine resolution pixels as low as 75 μm (Carbon3D 2019). The small-scale MPHX was fabricated using UMA 90 (urethane methacrylate) resin.

Process of Operating an MPHX

Figure 6:
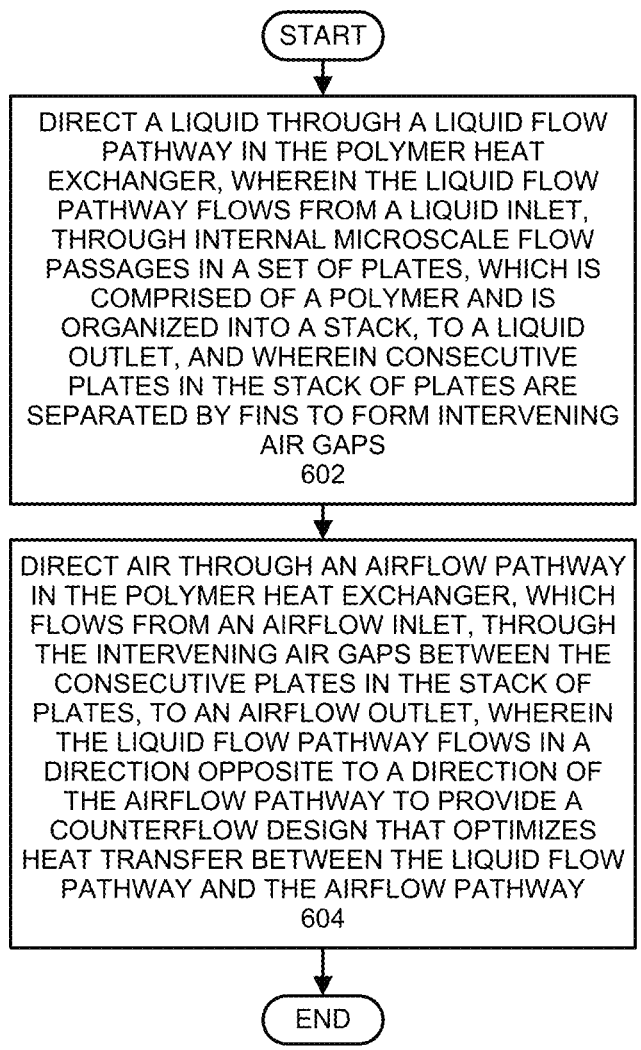
FIG. 6 presents a flow chart illustrating a process for operating a polymer heat exchanger with microscale flow passages in accordance with the disclosed embodiments.

FIG. 6 presents a flow chart illustrating a process for operating an MPHX in accordance with the disclosed embodiments. This process involves directing a liquid through a liquid flow pathway in the polymer heat exchanger, wherein the liquid flow pathway flows from a liquid inlet, through internal microscale flow passages in a set of plates (e.g., liquid flow passages 224 of FIG. 2D), which is comprised of a polymer and is organized into a stack, to a liquid outlet, and wherein consecutive plates in the stack of plates are separated by fins to form intervening air passages (step 602). The process also involves directing air through an airflow pathway in the polymer heat exchanger, which flows from an airflow inlet, through the intervening air passages between the consecutive plates in the stack of plates (e.g., air flow passages 234 of FIG. 2D), to an airflow outlet, wherein the liquid flow pathway flows in a direction opposite to a direction of the airflow pathway to provide a counterflow design that optimizes heat transfer between the liquid flow pathway and the airflow pathway (step 604)

Fabrication Process

Figure 7:
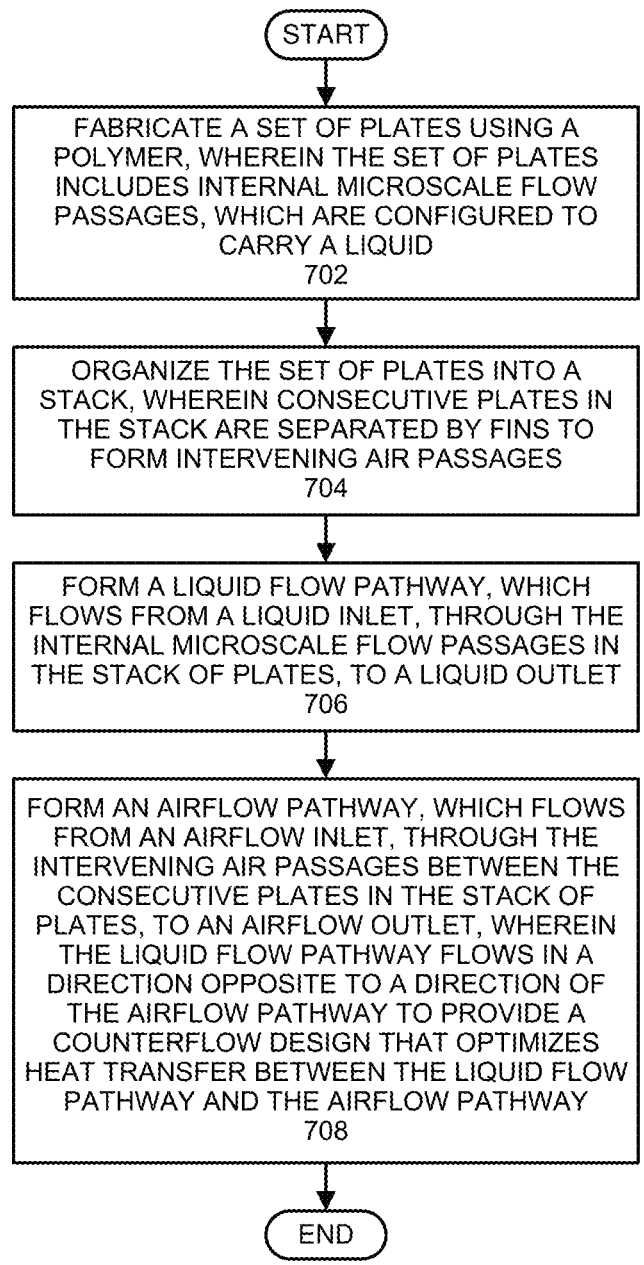
FIG. 7 presents a flow chart illustrating a process for fabricating a polymer heat exchanger with microscale flow passages in accordance with the disclosed embodiments.

FIG. 7 presents a flow chart illustrating a process for fabricating a polymer heat exchanger with microscale flow passages in accordance with the disclosed embodiments. This process involves fabricating a set of plates using a polymer, wherein the set of plates includes internal microscale flow passages, which are configured to carry a liquid (step 702). Next, the process organizes the set of plates into a stack, wherein consecutive plates in the stack are separated by fins to form intervening air passages (step 704). The process also involves forming a liquid flow pathway, which flows from a liquid inlet, through the internal microscale flow passages in the stack of plates, to a liquid outlet (step 706). The process additionally involves forming an airflow pathway, which flows from an airflow inlet, through the intervening air passages between the consecutive plates in the stack of plates, to an airflow outlet, wherein the liquid flow pathway flows in a direction opposite to a direction of the airflow pathway to provide a counterflow design that optimizes heat transfer between the liquid flow pathway and the airflow pathway (step 708).

Various Liquid Plate Designs

Figure 8A:
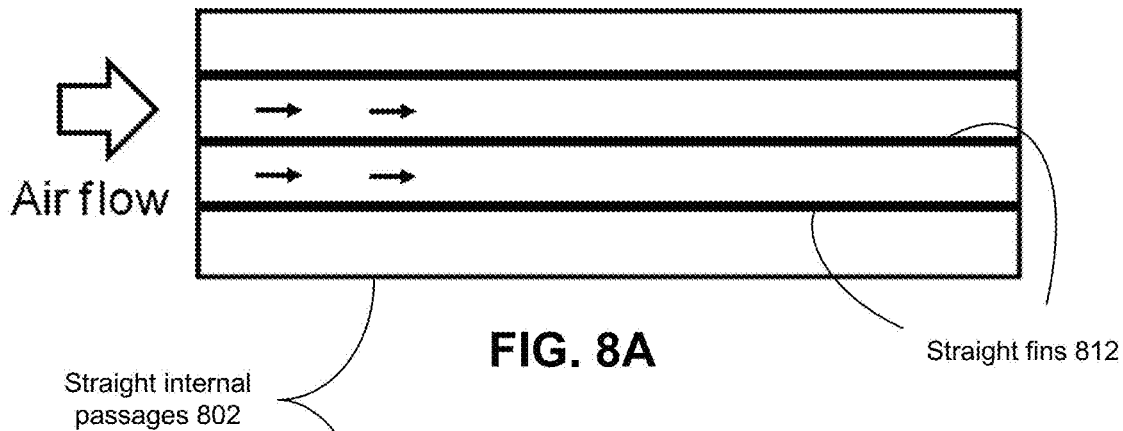
FIG. 8A illustrates a variant of a liquid plate design with straight internal passages and straight external fins stretched along the length of a plate in accordance with the disclosed embodiments.

A number of variations of the liquid plate designs are possible. For example, FIG. 8A illustrates a variant of the liquid plate design, which has straight internal passages 802 and straight external fins 812 stretched along the length of a plate.

Figure 8B:
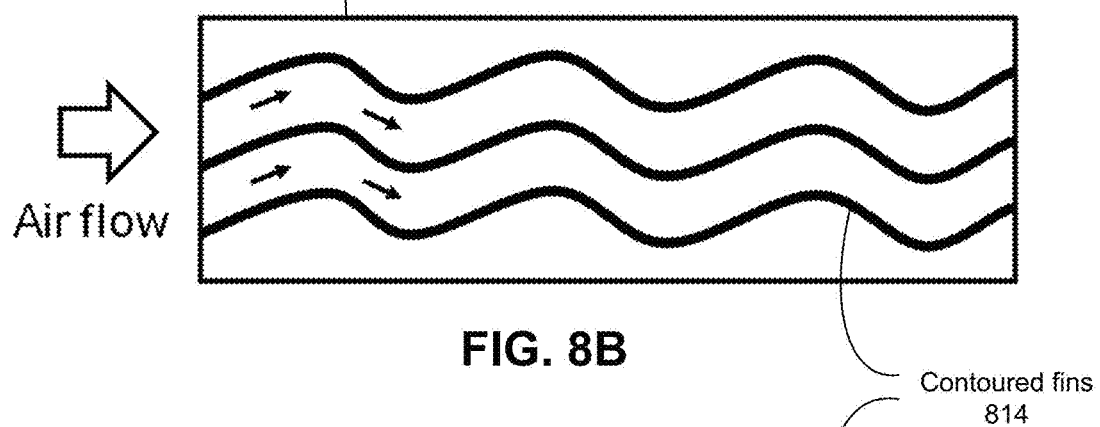
FIG. 8B illustrates a variant of liquid plate design, which has straight internal passages and curvy external fins, in accordance with the disclosed embodiments.

In contrast, FIG. 8B illustrates a variant of the liquid plate design, which has straight internal passages 802 and curvy (e.g., contoured) external fins 814. This design increases the length of the air passages, which leads to a longer residence time for the air. Hence, this design enhances heat transfer with the tradeoff of increasing the pressure drop on the air passage side.

Figure 8C:
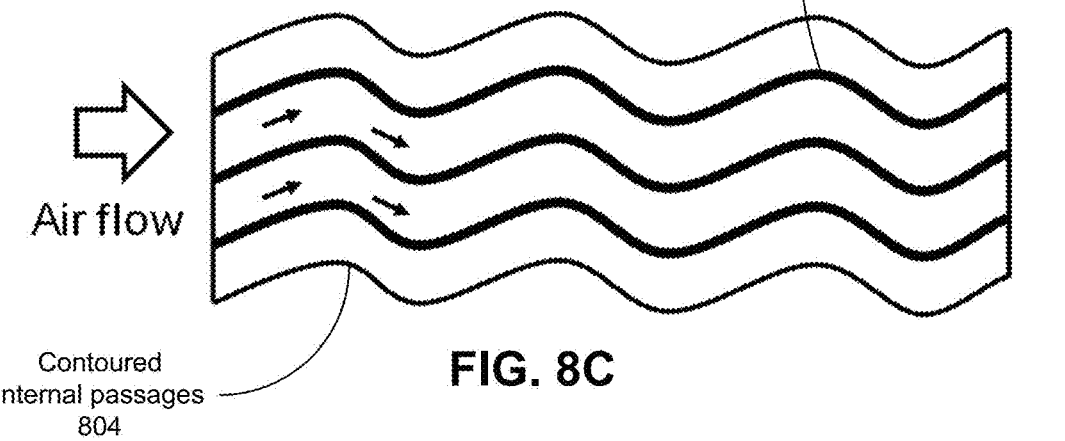
FIG. 8C illustrates a variant of water plate design, which has countered internal passages with conformal external fins that are similarly contoured, in accordance with the disclosed embodiments.

FIG. 8C illustrates a variant of liquid plate design, which has contoured countered internal passages 804 with conformal external fins 814 that are similarly contoured. This design increases both air and liquid passage lengths while keeping both flow streams in fully counter-flow order. Note that this design increases residence time in both liquid and air streams, which are flowing in counter directions. Hence, this design enhances heat transfer with the tradeoff of increasing pressure drop in both the air and liquid sides.

Figure 9:
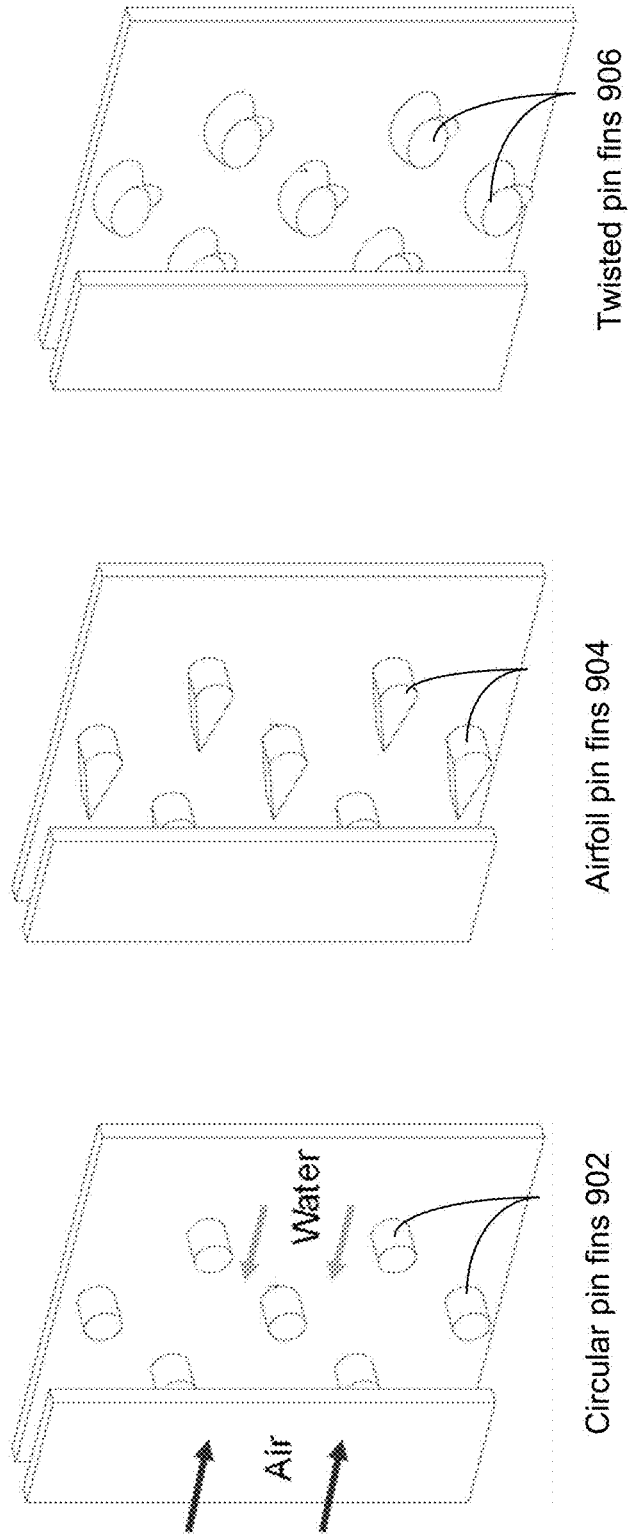
FIG. 9 illustrates variants of liquid plates with different pin fin shapes that can enhance heat transfer and/or reduce pressure drop on the liquid side in accordance with the disclosed embodiments.

Finally, FIG. 9 illustrates three variations of liquid plates with different pin fin shapes that enhance heat transfer and/or reduce pressure drop on the liquid side in accordance with the disclosed embodiments. As illustrated in FIG. 9, the liquid plates can have pin fin shapes that are circular 902, airfoil-shaped 904 or twisted 906.

Exemplary HX Applications

Figure 10:
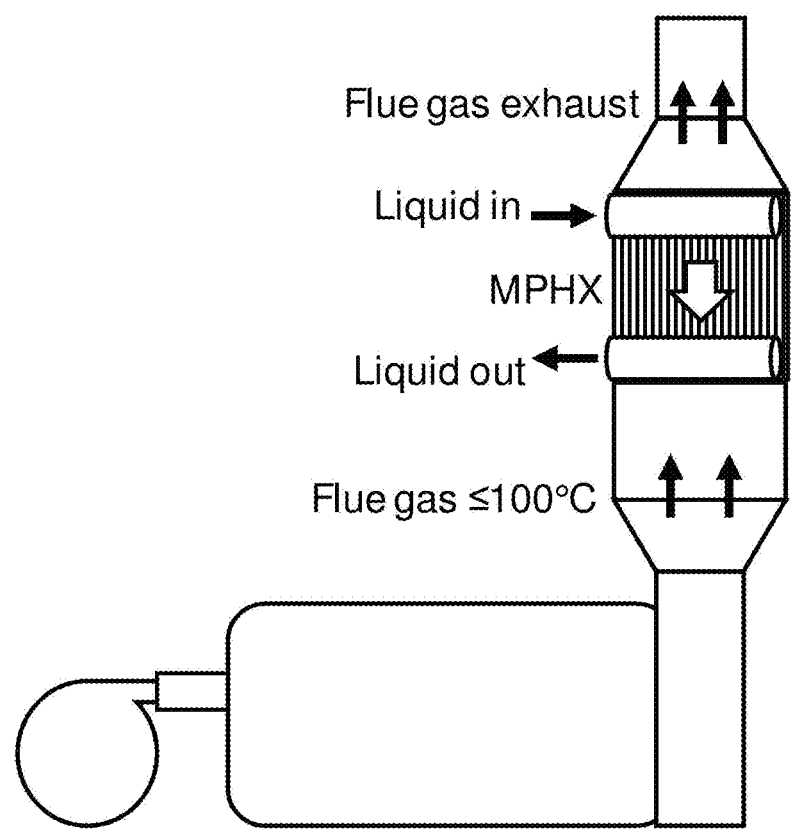
FIG. 10 illustrates an exemplary waste heat recovery system for an industrial process in accordance with the disclosed embodiments.
Figure 11:
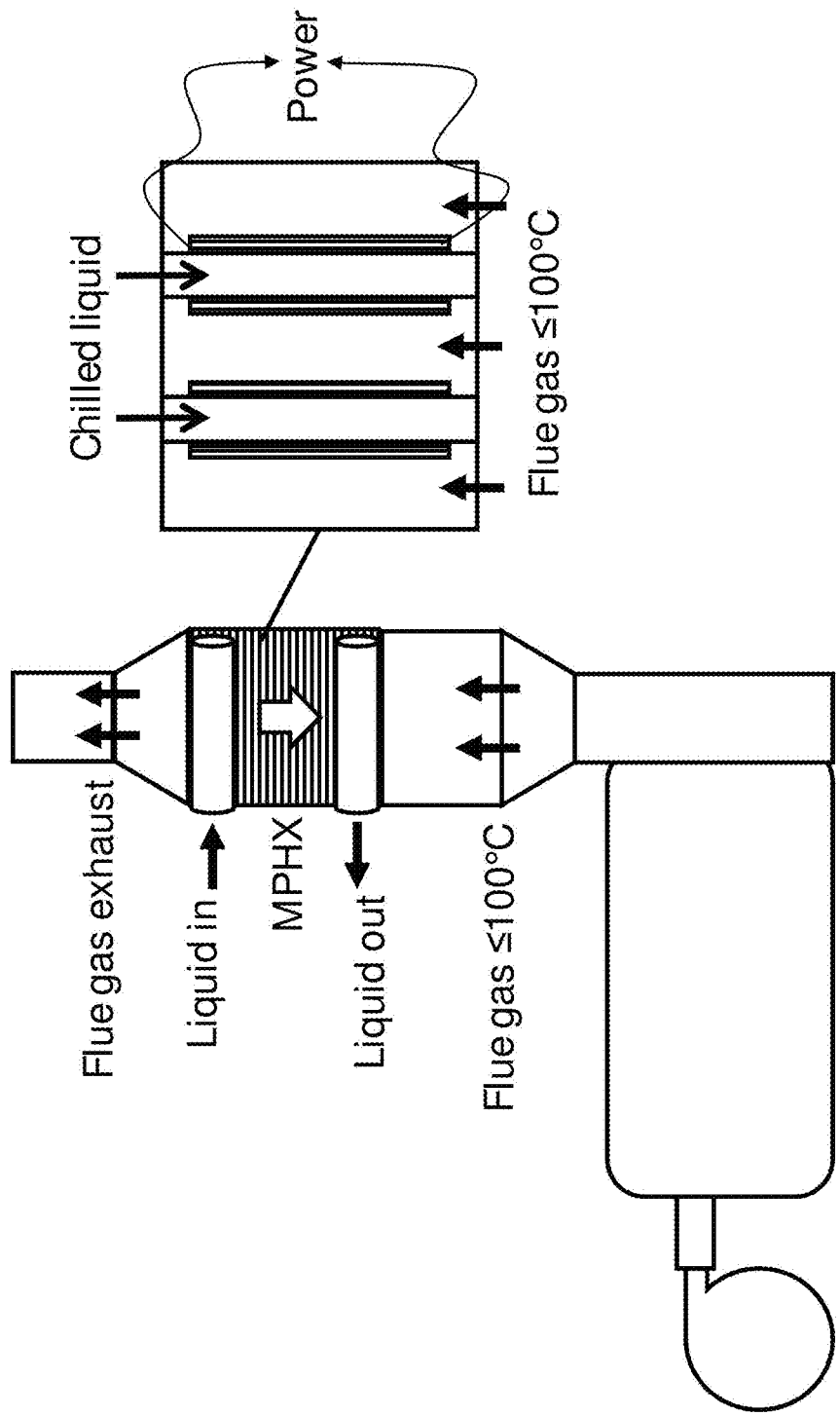
FIG. 11 illustrates an exemplary waste heat recovery system for an industrial process, which is integrated with thermoelectric device, in accordance with the disclosed embodiments.
Figure 12:
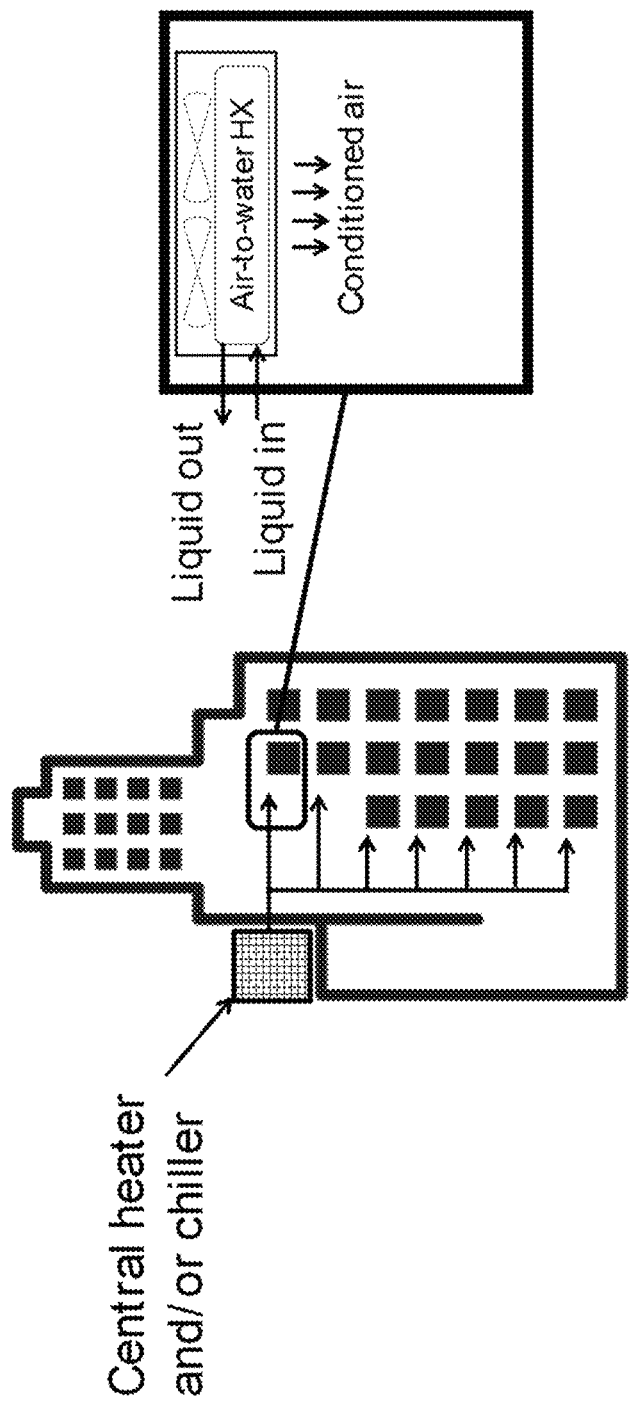
FIG. 12 illustrates an exemplary air conditioning system integrated with a central heater and/or chiller in a commercial building that provides hot and/or chilled liquid (water or glycol) to the building for air conditioning in accordance with the disclosed embodiments.
Figure 13:
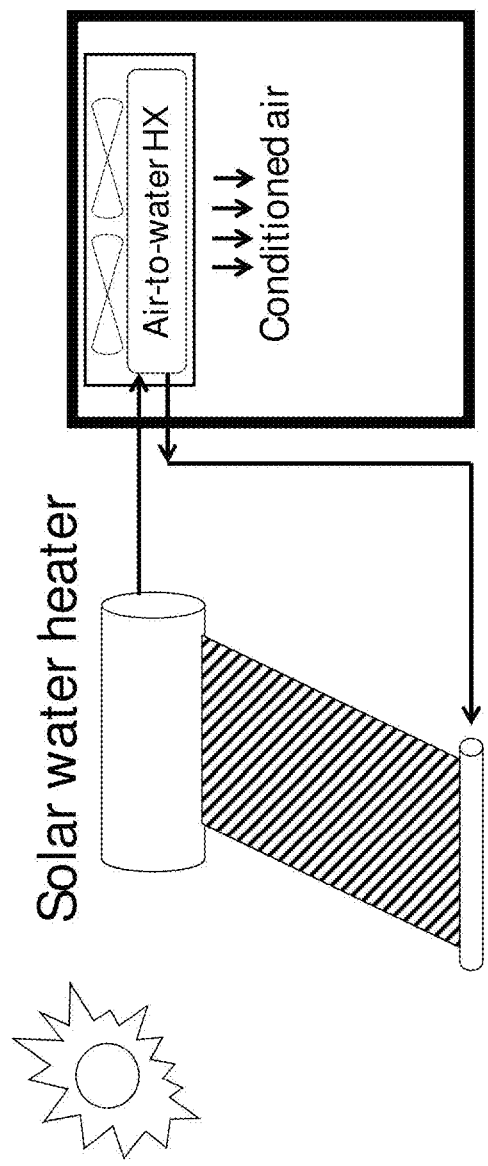
FIG. 13 illustrates an exemplary heating system integrated with a solar water heater in accordance with the disclosed embodiments.

The disclosed heat exchanger can also be used in different applications. For example, FIG. 10 illustrates using the heat exchanger to perform waste heat recovery for an industrial process. FIG. 11 illustrates a variation of the heat exchanger illustrated in FIG. 10, wherein the heat exchanger is integrated with a thermoelectric device that operates based on the Peltier effect. In another application, FIG. 12 illustrates an exemplary air conditioning system, which is integrated with a central heater and/or chiller, with a heat exchanger that operates in a commercial building and provides hot and/or chilled liquid (water or glycol) to the building for air conditioning purposes. FIG. 13 illustrates an exemplary heating system that includes a heat exchanger, which is integrated with a solar water heater. Finally, our heat exchanger design can also be used in automotive applications, for example in a radiator.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A system that provides a polymer heat exchanger, comprising:
    a set of plates comprised of a polymer that includes internal flow passages;
    which are configured to carry a liquid, wherein the internal flow passages within the set of plates include arrays of fins of uniform height;
    wherein the set of plates is organized into a stack, wherein consecutive plates in the stack are separated by fins of uniform height to form intervening air passages, and wherein the stack has a depth;
    wherein the polymer heat exchanger includes a liquid flow pathway from a liquid inlet, through the internal flow passages in the stack of plates, to a liquid outlet;
    wherein the polymer heat exchanger includes an airflow pathway from an airflow inlet, through the intervening air passages between the consecutive plates in the stack of plates, to an airflow outlet;
    wherein the liquid flow pathway flows in a direction opposite to a direction of the airflow pathway to provide a counterflow design that optimizes heat transfer between the liquid flow pathway and the airflow pathway; and
    wherein each plate in the set of plates includes a plurality of liquid plena positioned in a lateral direction in relation to the liquid flow pathway, wherein the liquid plena in the individual plates form continuous liquid plena in the depth of the stack, wherein the liquid plena are configured to carry liquid from the liquid inlet to the internal flow passages and from the internal flow passages to the liquid outlet in a counterflow design, and wherein the liquid plena extend within and across the air passages to allow airflow around and between the liquid plena.

2. The system of claim 1, wherein the fins that separate consecutive plates in the stack of plates are formed by protrusions, which are manufactured onto outer surfaces of the set of plates.

3. The system of claim 2, wherein the fins that separate consecutive plates are configured to be one or more of straight, interrupted and contoured.

4. The system of claim 1, wherein the internal flow passages within the set of plates include arrays of pin fins of uniform height to facilitate heat transfer and liquid flow distribution, and to provide mechanical strength.

5. The system of claim 4, wherein pin fins that comprise the array of pin fins are configured to be one or more of circular, airfoil-shaped and twisted.

6. The system of claim 1, wherein the polymer heat exchanger is part of a heating and/or cooling system for a building, which comprises:
    an external heat pump located outside of the building, which uses a low global warming potential (GWP) refrigerant;

a refrigerant-to-liquid heat exchanger located outside of the building, which exchanges heat between the low GWP refrigerant from the external heat pump and a heat-transfer liquid; and the polymer heat exchanger located inside the building, which exchanges heat between the heat-transfer liquid from the refrigerant-to-liquid heat exchanger and air, which flows through a heating and/or cooling system in the building.

7. The system of claim 1, wherein each plate in the set of plates is designed to be fabricated through an injection molding process, wherein a top surface and/or a bottom surface of the plate are formed through injection molding, and the top surface and the bottom surface are bonded together to form the plate, which includes the internal flow passages.

8. The system of claim 1, wherein each plate in the set of plates is designed to be manufactured through an additive manufacturing process.

9. The system of claim 1, wherein:
the stacked set of plates forms a heat exchanger module that provides a duct for airflow for the airflow pathway,
the system includes multiple heat exchanger modules, which are stacked in one or more dimensions orthogonal to a direction of the airflow to form a larger duct assembly, and
each of the multiple heat exchanger modules is coupled to the liquid inlet and the liquid outlet.

10. The system of claim 1, wherein the liquid in the polymer heat exchanger comprises one of water and glycol.

11. The system of claim 1, wherein the internal flow passages in the set of plates are 0.25 mm to 1.0 mm or less in width.

12. The system of claim 1, wherein the system is configured to be used in industrial processes to efficiently extract low grade waste heat from gaseous heat sources.

13. The system of claim 1,
wherein the system is configured to measure a flow rate of air by measuring a pressure drop across the polymer heat exchanger; and
wherein the system is configured to use the pressure drop to continuously monitor the state of the polymer heat exchanger to determine whether the polymer heat exchanger needs to be serviced.

14. A method for operating a polymer heat exchanger with flow passages, comprising:
directing a liquid through a liquid flow pathway in the polymer heat exchanger, wherein the liquid flow pathway is from a liquid inlet, through internal flow passages in a set of plates, to a liquid outlet, wherein the internal flow passages within the set of plates include arrays of fins of uniform height, which plates are comprised of a polymer and are organized into a stack, wherein the stack has a depth, and wherein consecutive plates in the stack of plates are separated by fins of uniform height to form intervening air passages; and
directing air through an airflow pathway in the polymer heat exchanger, which flows from an airflow inlet, through the intervening air passages between the consecutive plates in the stack of plates, to an airflow outlet;
wherein the liquid flow pathway is in a direction opposite to a direction of the airflow pathway to provide a counterflow design that optimizes heat transfer between the liquid flow pathway and the airflow pathway; and wherein each plate in the set of plates includes a plurality of liquid plena positioned in a lateral direction in relation to the liquid flow pathway, wherein the liquid plena in the individual plates form continuous liquid plena in the depth of the stack, wherein the liquid plena are configured to carry liquid from the liquid inlet to the internal flow passages and from the internal flow passages to the liquid outlet in a counterflow design, and wherein the liquid plena extend within and across the air passages to allow airflow around and between the liquid plena.

15. A heating and/or cooling system for a building, comprising:
an external heat pump located outside of the building, which uses a low global warming potential (GWP) refrigerant;
a refrigerant-to-liquid heat exchanger located outside of the building, which exchanges heat between the low GWP refrigerant from the external heat pump and a heat-transfer liquid; and
a polymer heat exchanger located inside the building, which exchanges heat between the heat-transfer liquid from the refrigerant-to-liquid heat exchanger and air, which flows through a heating and/or cooling system in the building;
wherein the polymer heat exchanger comprises:
a set of plates comprised of a polymer that includes internal flow passages which are configured to carry a liquid, wherein the internal flow passages within the set of plates include arrays of fins of uniform height;
wherein the set of plates is organized into a stack, wherein consecutive plates in the stack are separated by fins of uniform height to form intervening air passages, and wherein the stack has a depth;
wherein the polymer heat exchanger includes a liquid flow pathway from a liquid inlet, through the internal flow passages in the stack of plates, to a liquid outlet;
wherein the polymer heat exchanger includes an airflow pathway from an airflow inlet, through the intervening air passages between the consecutive plates in the stack of plates, to an airflow outlet;
wherein the liquid flow pathway flows in a direction opposite to a direction of the airflow pathway to provide a counterflow design that optimizes heat transfer between the liquid flow pathway and the airflow pathway; and
wherein each plate in the set of plates includes a plurality of plena positioned in a lateral direction in relation to the liquid flow pathway, wherein the liquid plena in the individual plates form continuous liquid plena in the depth of the stack, wherein the liquid plena are configured to carry liquid from the liquid inlet to the internal flow passages and from the internal flow passages to the liquid outlet in a counterflow design, and wherein the liquid plena extend within and across the air passages to allow airflow around and between the liquid plena.

16. The heating and/or cooling system of claim 15, wherein
the set of plates forms a heat exchanger module that provides a duct for airflow through the airflow pathway,
the polymer heat exchanger includes multiple heat exchanger modules, which are stacked in one or more dimensions orthogonal to a direction of the airflow to form a larger duct assembly, and
each of the multiple heat exchanger modules is coupled to the liquid inlet and the liquid outlet.

17. A system that provides a heat exchanger, comprising:
- a set of plates that includes internal flow passages, which are configured to carry a liquid, wherein the internal flow passages within the set of plates include arrays of fins of uniform height;
- wherein the set of plates is organized into a stack, wherein consecutive plates in the stack are separated by fins of uniform height to form intervening air passages, and wherein the stack has a depth;
- wherein the heat exchanger includes a liquid flow pathway from a liquid inlet, through the internal flow passages in the stack of plates, to a liquid outlet;
- wherein the heat exchanger includes an airflow pathway from an airflow inlet, through the intervening air passages between the consecutive plates in the stack of plates, to an airflow outlet;
- wherein the liquid flow pathway flows in a direction opposite to a direction of the airflow pathway to provide a counterflow design that optimizes heat transfer between the liquid flow pathway and the airflow pathway; and
- wherein each plate in the set of plates includes a plurality of liquid plena positioned in a lateral direction in relation to the liquid flow pathway, wherein the liquid plena in the individual plates form continuous liquid plena in the depth of the stack, wherein the liquid plena are configured to carry liquid from the liquid inlet to the internal flow passages and from the internal flow passages to the liquid outlet in a counterflow design, and wherein the liquid plena extend within and across the air passages to allow airflow around and between the liquid plena.

* * * * *